(12) United States Patent
Chadaga et al.

(10) Patent No.: US 10,645,595 B1
(45) Date of Patent: *May 5, 2020

(54) SYSTEM AND METHOD FOR IDENTIFYING WIRELESS COVERAGE FOR MULTI-OCCUPANT STRUCTURES

(71) Applicant: Verizon Patent and Licensing Inc., Arlington, VA (US)

(72) Inventors: Deepak Chadaga, Coppell, TX (US); Alex Pacamarra, Ringwood, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,774

(22) Filed: Jul. 24, 2019

Related U.S. Application Data

(63) Continuation of application No. 16/156,142, filed on Oct. 10, 2018, now Pat. No. 10,405,196.

(51) Int. Cl.
*H04W 16/20* (2009.01)
*G06K 9/62* (2006.01)
*G06K 9/00* (2006.01)
*H04N 5/247* (2006.01)
*H04B 17/318* (2015.01)

(52) U.S. Cl.
CPC ........ *H04W 16/20* (2013.01); *G06K 9/00664* (2013.01); *G06K 9/6292* (2013.01); *H04B 17/318* (2015.01); *H04N 5/247* (2013.01)

(58) Field of Classification Search
CPC ..................................................... H04W 16/20
USPC ......................................................... 455/446
See application file for complete search history.

(56) References Cited

U.S. PATENT DOCUMENTS

2004/0169587 A1    9/2004  Washington

*Primary Examiner* — Joel Ajayi

(57) ABSTRACT

A method, a device, and a non-transitory storage medium provide for receive line-of-site (LoS) information obtained by a camera, wherein the LoS information identifies an LoS from a radio site to a potential radio signal receiver location; estimate a signal strength value, for a signal from the radio site, at the potential radio signal receiver location; identify a first type of obstruction in the LoS, wherein a signal loss associated with the first type of obstruction varies by a time of year; modify the estimated signal strength value using a nominal signal loss value for the first type of obstruction, wherein the nominal signal loss value is associated with a different time of year than the time of year in which the LoS information is obtained; and determine whether to qualify the potential radio signal receiver location for an equipment installation for the wireless service based on a threshold signal value.

20 Claims, 6 Drawing Sheets

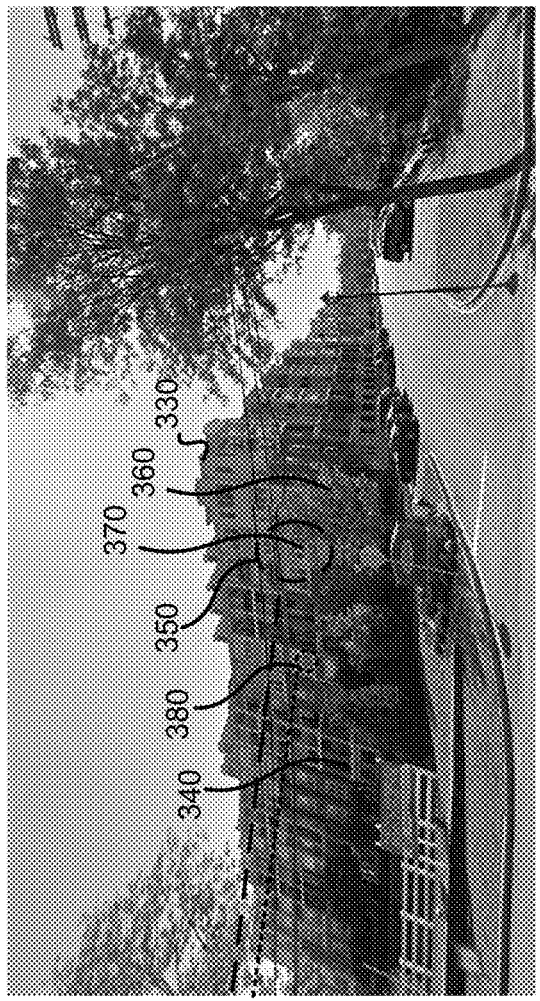
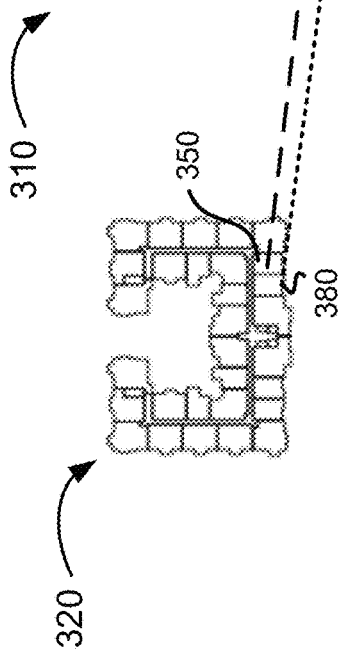

SYSTEM AND METHOD FOR IDENTIFYING WIRELESS COVERAGE FOR MULTI-OCCUPANT STRUCTURES

RELATED APPLICATION

The present application is a continuation of, and claims priority from, U.S. application Ser. No. 16/156,142 filed Oct. 10, 2018, entitled "System and Method for Identifying Wireless Coverage for Multi-Occupant Structures," the contents of which are hereby incorporated by reference herein in its entirety.

BACKGROUND

Given the line-of-sight (LoS) characteristics of future generation wireless networks (e.g., Fifth Generation (5G) networks), determining with precision prospective service coverage for individual potential user sites within a structure (e.g., multi-dwelling units, multi-tenant business complexes, etc.) presents technological challenges.

BRIEF DESCRIPTION OF THE DRAWINGS

FIG. 3A is a diagram illustrating an exemplary image captured at an exemplary radio site;

FIG. 3B is a diagram illustrating exemplary image data for use in an exemplary embodiment of a service qualification described herein;

FIG. 3C is a diagram illustrating exemplary building information for use in the exemplary embodiment of the service qualification.

DETAILED DESCRIPTION OF PREFERRED EMBODIMENTS

Figure 1:
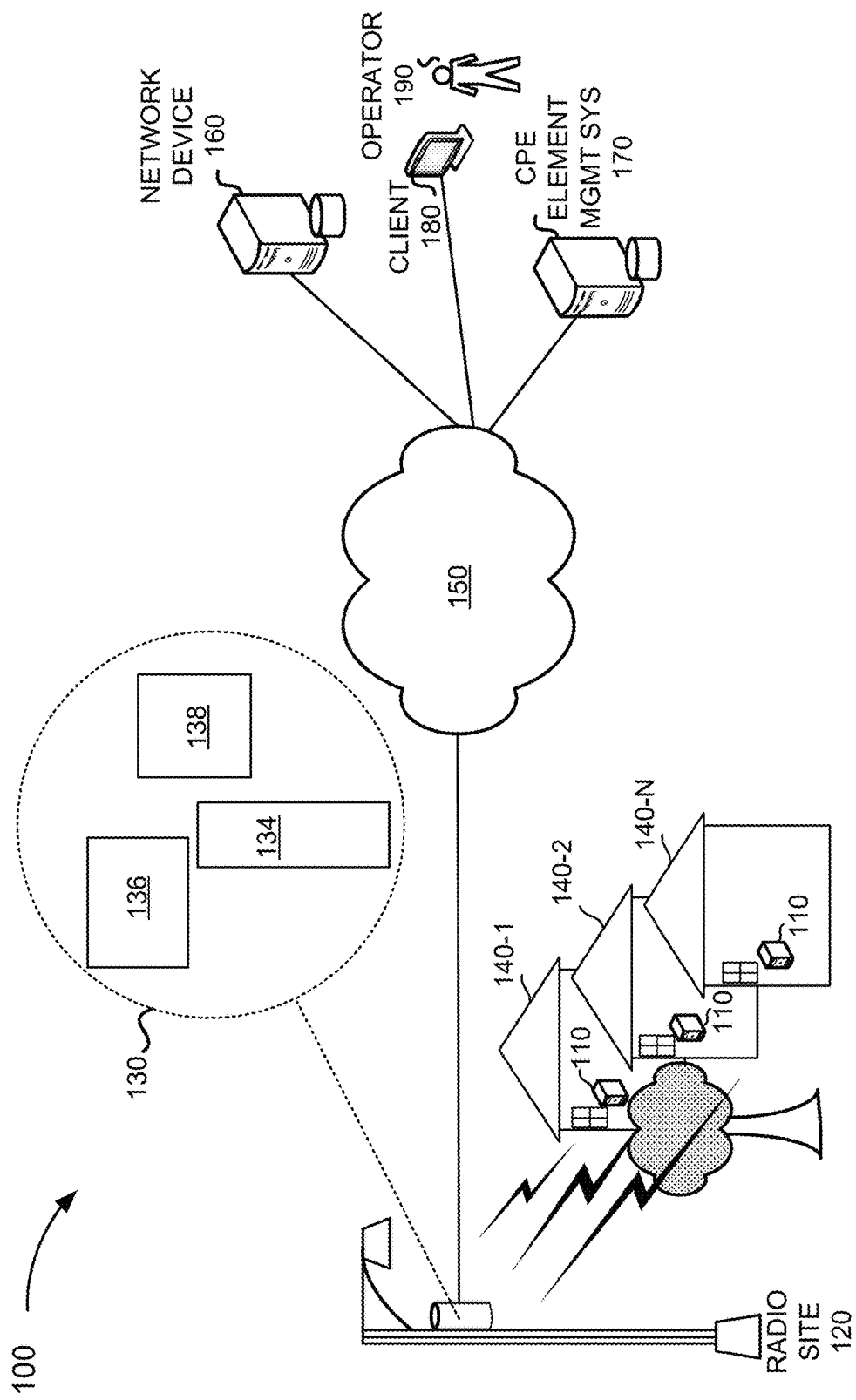
FIG. 1 is a diagram illustrating an exemplary environment in which an exemplary embodiment of a service qualification may be implemented.

The following detailed description refers to the accompanying drawings. The same reference numbers in different drawings may identify the same or similar elements. Also, the following detailed description does not limit the invention.

Wireless access networks may operate within a frequency spectrum, such as between about 1 to about 100 Gigahertz. Wireless devices in such networks may be deployed using LoS configurations between wireless stations. Although the future generation wireless network is designed with improvements in mind for various network parameters, such as traffic capacity, latency, data throughput, etc., these prospective benefits may not be realized for every user location due to various factors. For example, certain building configurations and/or environmental settings may reduce expected network metrics at different placements and distances of users' receiving equipment from a future generation transmission site. Thus, a need exists for a technological solution for accurately and efficiently identifying a coverage area for a future generation antenna transmitter/receiver or radio unit, and differentiating between qualified/non-qualified user sites within the transmitter/receiver's service area or coverage area.

According to an exemplary embodiment, a coverage locator system is described that assesses the extent of future generation wireless access for a given location. For example, a future or a next generation wireless access may be a 5G technology. As used herein, the term 5G is referring to an advanced or next generation wireless network and is not intended to limit the disclosed embodiments to any specific standard or evolution of advanced wireless networks. According to various exemplary implementations, the location may be a user's residence (e.g., an apartment complex, a condominium, etc.), a place of business (e.g., an office building, a shopping center, etc.), a public facility (e.g., a municipal building, a school campus, etc.), or other type of building. Using this technological solution, installation of 5G equipment may be limited to those user sites that "qualify" for 5G access in advance of obtaining and setting up customer premises equipment (CPE) for receiving 5G wireless service. In this manner, resources and equipment are not expended for unnecessary installs at user sites for which it is determined that 5G service would not be accessible.

According to an exemplary embodiment, the service qualification process or coverage locator system calculates an expected signal strength loss along a path from the radio site to a potential user site located in a building. According to an exemplary implementation, LoS information obtained by a smart coverage locator system at the radio site is used to estimate path loss to individual potential user sites at the location. For example, LoS data may be acquired using computer vision generated, for example, from data acquired by a camera device and/or a ray tracing tool located with an antenna transmitter (e.g., pole-mounted radio unit) at a radio site, and processed by an analytics engine, etc., locally and/or remotely at a network device. According to an exemplary embodiment, the analytics engine, for example, may be instructed to use signal strength loss modeling with respect to one or more obstructions identified in images of a path from a radio site to potential user site locations that may be pinpointed using the LoS data and/or other information. The service qualification system may, for example, calculate and model a signal loss value based on nominal loss values assigned to particular types of obstructions (e.g., foliage, signage, structures, etc.). As used here, "LoS" may include a clear, unobstructed LoS, and/or a would-be LoS path that is at least partially obstructed by one or more objects.

According to an exemplary implementation, the signal strength values may be calculated for locations at the building exterior which are associated with potential user sites. The coverage locator system may further determine signal strength values based on penetration loss through the building exterior (e.g., walls, glass windows/doors, low-emissivity (low-E) glass, etc.) to indoor potential user sites.

According to an exemplary embodiment, the qualification service includes calculating a 5G received signal power based on the 5G path loss. According to an exemplary embodiment, the 5G received signal power may be compared to a threshold value to determine whether a potential user site qualifies for 5G equipment installation for 5G access. When the 5G received signal power meets the threshold value, the qualification service may determine that the location is a candidate 5G user site. However, when the 5G received signal power does not satisfy the threshold value, the qualification service may determine that the location is not a candidate 5G user site. According to an exemplary embodiment, a service is described that initiates and/or directs installation of the 5G receiving equipment at candidate 5G candidate user sites per user requests.

According to an exemplary embodiment, the coverage locator system uses LoS data to identify a building, user information associated with the building, and/or public or other records regarding the layout/orientation of the building to substantially determine individual potential user sites within the building. According to an exemplary implementation, the coverage locator system uses a machine learning algorithm that may modify estimated coverage values based on successful installations at existing user sites within the same building. According to an exemplary implementation, the coverage locator system may make seasonal adjustments to estimated coverage values where one or more LoS parameters may be affected by climate. For example, it may be determined that one or more of the identified obstructions includes foliage that is subject to seasonal changes.

FIG. 1 is a diagram illustrating an exemplary environment 100 in which an exemplary embodiment of a service qualification or coverage locator may be implemented. As illustrated, environment 100 includes customer premises equipment (CPE) 110, a radio site 120, a radio unit 130, customer premises 140-1 to 140-N, a network 150, and a network device 160. Environment 100 may also include CPE management element system 170, client device 180, and operator 190. The number and arrangement of devices in environment 100 are exemplary. According to other embodiments, environment 100 may include additional devices and/or differently arranged devices, than those illustrated in FIG. 1.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device). For example, network device 160 or CPE element management system 170 may be implemented according to various computing architectures and/or one or multiple network architectures.

CPE 110 includes one or more network devices of a wireless access network which have computational and wireless communicative capabilities. For example, CPE 110 may be implemented as a modem capable of receiving radio signals, a router, a transceiver and/or other network equipment, which together may function as a wireless access point to the radio network.

Radio site 120 may include a network device of a wireless access network that has wireless capabilities or wireless capabilities and computational capabilities to be installed or already installed. For example, radio site 120 may include a radio unit 130 that includes an antenna transmitter 134 that may be implemented as a radio remote unit (RRU). According to another example, antenna transmitter 134 may be implemented as an integrated Radio Unit (RU) and a baseband unit (BBU). According to an exemplary implementation, the network device operates according to a future generation wireless technology. For example, RRU and/or RU/BBU may be implemented as a wireless device of a 5G wireless access network or a 5G wireless fronthaul network. The network device may wirelessly communicate within a frequency band between about 1 GHz to about 100 GHz. For example, the network device may transmit in about the 28 GHz spectrum, the 39 GHz spectrum, or some other spectrum below about 100 GHz. In one embodiment, antenna transmitter 134 may have a transmission angle of a range of angles, such as about 30-180 degrees, e.g., about 130 degrees or any other angle.

According to an exemplary embodiment, radio unit 130 includes a camera 136 that records digital video and/or images in a vicinity of radio site 120. Camera 136 may be mounted, for example, on a pole, on a tower, etc., with antenna transmitter 134. Camera 136 may be moveably attached to the pole, i.e., having panning and/or tilting capabilities. Fixed or movable, camera 136 may have a viewing angle that is equal to or greater than the transmission angle of antenna transmitter 134. For example, camera 136 may have a viewing angle between about 30 and 180 degrees, e.g., about 130 degrees or any other angle. Camera 136 may capture, store, and/or transmit image data that includes, for example, timestamp information, directional information, location information, or other metadata etc., using IP or other communication protocols. In an exemplary implementation, camera 136 may use a ray tracing tool (not illustrated) that is capable of tracing the movements of camera 136. In one embodiment, the ray tracing tool may be used in detecting reflective surfaces, glass (e.g., windows, doors, etc.) located on building exteriors. Data obtained using the ray tracing tool may be stored with image data captured by camera 136.

According to an exemplary embodiment, radio unit 130 includes an analytics engine 138 including logic that provides a qualification service or coverage locator system, as described herein. According to an exemplary implementation, analytics engine 138 stores or has access to storage (e.g., a remote storage device) containing information pertaining to the qualification service and the coverage locator system. For example, analytics engine 138 may store or have access to a database, as described herein. The information may include data pertaining to locations (e.g., latitude and longitude values, physical addresses, etc.) of radio sites, characteristic information pertaining to radio sites, information obtained from antenna transmitter 134, camera 136, and/or other devices, information obtained from a third-party service, threshold values, values pertaining to path loss, and loss values to calculate path losses. According to an exemplary implementation, analytics engine 138 uses data from third party sources pertaining to building locations, orientations, floorplans, occupancy, etc.

Customer premises 140-1 to 140-N (collectively, customer premises 140) may be any type of structure that may be occupied by a user. For example, customer premises 140 may be a single family home, a multi-unit dwelling, such as a townhouse, an apartment, a condo, or other type of multi-occupant residence. Customer premises 140 may be a commercial center, a public venue, an industrial complex, or other type of infrastructure (e.g., a medical facility, an educational campus, a governmental building, a military installation, an office park, etc.).

Network device 160 includes a device that has communication and computational capabilities. For example, network device 160 may be implemented as a computer or a computer and a mass storage device. By way of further example, network device 160 may include a Web server or an Internet Protocol (IP) server. Network device 160 may reside in a network (not illustrated), such as, for example, a private network, a public network (e.g., the Internet, the World Wide Web, etc.), a wide area network (WAN), a metropolitan area network (MAN), a service provider network, an IP Multimedia Subsystem (IMS) network, a Rich Communication Service (RCS) network, a cloud network, or other type of network that may be external to the wireless access network and/or a core network to which radio unit 130 belongs or is communicatively coupled. According to an exemplary implementation, network device 160 may be accessed via network 150.

According to an exemplary embodiment, analytics engine 138 and/or network device 160 may calculate a path loss for 5G service based on site characteristics data obtained by/retrieved from analytics engine 138 at radio site 120. According to an exemplary implementation, path loss values for 5G service are based on LoS data obtained via camera 136, particularly automatically-identified building indicia, building exterior glass (e.g., non-low-E and/or low-E), obstructing objects (e.g., signage, foliage, etc.), existing user sites in the building accessing 5G service, etc. According to an exemplary embodiment, analytics engine 138 and/or network device 130 calculates estimated 5G received signal strength values based on the path loss values for individual potential user sites for customer premises 140.

According to an exemplary embodiment, analytics engine 138 and/or network device 160 includes a machine learning algorithm. The machine learning algorithm may analyze and modify various values stored in the information, as described herein. For example, values associated with shapes and colors of objects may be used in digital image processing to identify and differentiate one type of object (e.g., foliage) from another type of object (e.g., structure). This data may be grouped in a database of like image models and used to categorize an object's impact on LoS signal strength (e.g., attenuation, deflection, etc.). Over time, the characteristic values may be adjusted based on the acquired data.

Network 150 includes one or multiple networks of one or multiple types. For example, network 150 may be implemented to include a terrestrial network, a content delivery network, a wireless network, a wired network, an optical network, a radio access network, a core network, a packet network, an Internet Protocol (IP) network, the Internet, the World Wide Web, a private network, a public network, a television distribution network, a streaming network, a mobile network, and/or other type of network that provides access to radio site 120. In one exemplary embodiment, network 150 may be a backhaul network.

CPE management system 170 includes a device that has computational and wireless communication capabilities. CPE management system 170 may be implemented as a server device capable of communicating with CPE 110. CPE management system 170 may send instruction messages to CPE 110 and/or receive data from CPE 110.

Client 180 includes a device that has computational and wireless communication capabilities. Client 180 may be implemented as a mobile device or a portable device and may be operated by operator 190 (e.g., service provider personnel). For example, client 180 may be implemented as a specialized device, a smartphone, a personal digital assistant, a tablet, a laptop, a netbook, a phablet, a wearable device, or some other type of wireless computational device. According to an exemplary embodiment, client 180 is configured to communicate with CPE 110 and/or analytics engine 138. According to an exemplary implementation, client 180 may be a wireless device that has 4G, LTE, or LTE-A wireless capabilities. Client device 180 may also include other components that may be used to support the qualification service or the coverage locator, as described herein.

Figure 2:
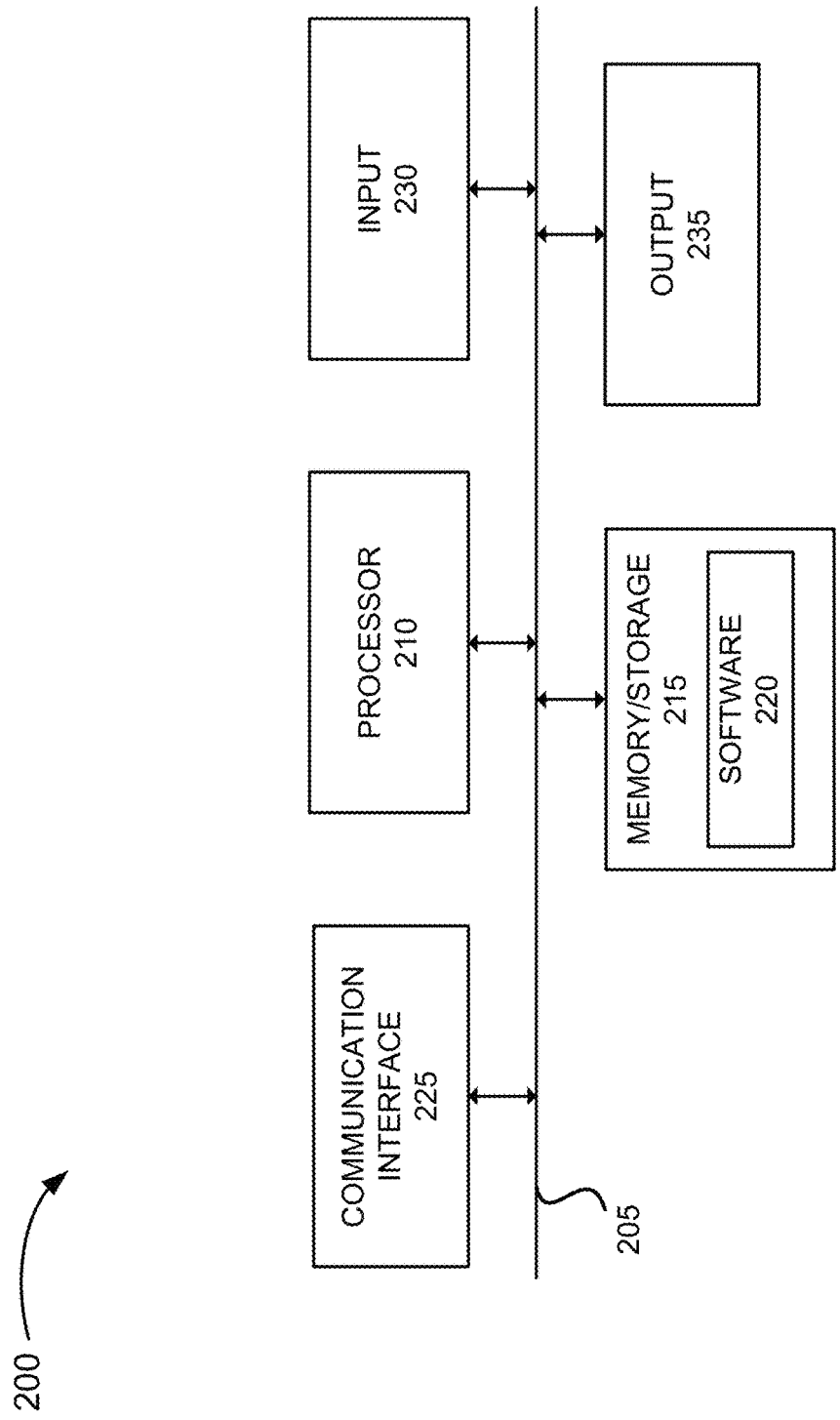
FIG. 2 a diagram illustrating exemplary components of a device that may correspond to one or more of the devices illustrated herein.

FIG. 2 is a diagram illustrating exemplary components of a device 200 that may correspond to one or more of the devices described herein. For example, device 200 may correspond to components of CPE 110, radio site 120, radio unit 130, analytics engine 138, network device 160, CPE element management system 170 and/or client 180. As illustrated in FIG. 2, device 200 includes a bus 205, a processor 210, a memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, clocks, and so forth.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc.

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 215 may include a hard disk (e.g., a magnetic disk, an optical disk, a magneto-optic disk, a solid state disk, etc.) and a corresponding drive. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include drives for reading from and writing to the storage medium.

Memory/storage 215 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. As an example, with reference to server 130, software 220 may include an application that, when executed by processor 410, provides the functions of the qualification, as described herein. Also, network device 160 may include an application that, when executed by processor 210, provides the functions of the qualification service, as described herein. Software 220 may also include firmware, middleware, microcode, hardware description language (HDL), and/or other form of instruction.

Communication interface 225 permits device 200 to communicate with other devices, networks, systems, and/or the like. Communication interface 225 includes one or multiple wireless interfaces. Communication interface 225 may include one or multiple wired interfaces. For example, communication interface 225 may include one or multiple transmitters and receivers, or transceivers. Communication interface 225 may operate according to a protocol stack and a communication standard. Communication interface 225 may include an antenna. Communication interface 225 may include various processing logic or circuitry (e.g., multiplexing/de-multiplexing, filtering, amplifying, converting, error correction, etc.).

Input 230 permits an input into device 200. For example, input 230 may include a keyboard, a mouse, a display, a touchscreen, a touchless screen, a button, a switch, an input port, speech recognition logic, and/or some other type of visual, auditory, tactile, etc., input component. Output 235 permits an output from device 200. For example, output 235 may include a speaker, a display, a touchscreen, a touchless screen, a light, an output port, and/or some other type of visual, auditory, tactile, etc., output component.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

FIGS. 3A-3C are diagrams illustrating an exemplary wireless service qualification process and coverage locator system. According to various embodiments, an operation or a step described in the process may be performed by analytics engine 138, network device 160, or a combination of network device 160 and analytics engine 138. Also, a communicative connection between network devices (e.g., CPE 110 and analytics engine 138) and/or between network device 160 and network devices (e.g., CPE 110, analytics engine 138) may be indirect. For example, an indirect communication connection may involve an intermediary device and/or an intermediary network not illustrated in FIGS. 3A-3C.

Referring to FIG. 3A, an image 300 may be captured by camera 136 of radio unit 130 mounted at a pole, for example, on a street corner of an intersection. Image 300 may correspond to a photo and/or a segment of a video recording that is automatically obtained (e.g., at predetermined times, regular and/or irregular intervals, etc.) and/or in response to a trigger event (e.g., an installation of radio unit 130, a customer request for service, a change of season, a customer complaint, a detected change in signal coverage and/or data traffic, etc.). In one embodiment, camera 136 may be configured to provide image 300 as a visual representation that substantially corresponds to a radio coverage area at radio site 120. For example, when a position of camera 136 is fixed, camera 136 may be provided with a lens having a viewing angle that is coextensive with or greater than a transmission angle of antenna transmitter 134. Alternatively, when camera 136 has a lens with a viewing angle that is less than a transmission angle of antenna transmitter 134, camera 136 may be provided with panning capabilities that expand the viewing angle to be coextensive with or greater than the associated transmission angle.

In one embodiment, camera 136 may be integrated with antenna transmitter 134 and/or analytics engine 138. Alternatively, camera 136 may be a separate device that is mounted together with antenna transmitter 134. As an alternative to being mounted at radio site 120, camera 136 may be a mobile device that is temporarily located at radio site 120. For example, camera 136 may be associated with a drone device that is automatically re-located to/from radio site as needed and/or directed.

In one embodiment, images recorded by camera 136 include metadata (e.g., a timestamp, location information, orientation information, etc.) obtained by camera 136, and/or other information generated by other devices, such as a ray tracing tool associated with radio unit 130. Metadata from camera 136 may be associated with information identifying radio unit 130 and/or geographic information for the location. Camera 136 may store recorded information in any number of formats for retrieval and/or for sending, for example, to analytics engine 138. In some embodiments, a live video stream may be provided to network device 160 via network 150. In one embodiment, camera 136 is GPS-enabled, and the metadata includes location information (e.g., latitude and longitude coordinates, altitude, physical address, etc.)

Analytics engine 138 associated with radio unit 130 obtains the image data associated with image 300 from camera 136. In one embodiment, analytics engine 138 performs image processing of image 300 to identify objects captured in the images, and their relative locations, for example, with respect to antenna transmitter 134. Image data 310 is illustrative of an augmented reality representation generated from image processing that may be performed on image 300. In one embodiment, some or all of the image processing may be performed by camera 136 or another device.

Analytics engine 138 identifies an exterior of a building 330 in image data 310. For example, analytics engine 138 may use object recognition logic to determine that building 330 is a user-occupied structure, and directional information (e.g., GPS) may be used to identify one or more faces of the building exterior (e.g., based on cross street information associated with radio site 120, which is retrieved from a database). For a building that has a single street address, analytics engine 138 may search for other indicia that further identify the building. For example, analytics engine 138 may identify a main entrance to building 330 and locate, on a marquee, canopy, overhang, etc., a building number 340 or other identifying mark. Referring to FIG. 3B, according to this example, the image area at building number 340 indicates that building 300 is building "#3." Other reference information may be identified, for example, "East Entrance," etc., that may be used to determine an orientation of building 330. Other indicia (e.g., signage, etc.) may be used to determine that building 330 is a multi-unit or multi-suite building, which may be occupied by more multiple users potentially using multiple 5G user sites.

Using some or all of the indicia identified on the faces of the building, analytics engine 138 may retrieve, from network device 160, for example, geographic information for building 330, such as a physical address, and/or survey information including distance information indicating distances of the faces of building 330 to radio unit 130. In one embodiment, the survey information may include beam reference signals received power (RSRP) values for locations on the faces of building 330. In one embodiment, the RSRP values may be based on calculations from transmission parameters for antenna transmitter 134 and/or measurements performed using measurement devices on location. The RSRP values may account for distance-related air loss for signals along the paths from antenna transmitter 134 to locations on a face of building 330, while not accounting for obstructions in the LoS between camera 136 and building 330.

In one embodiment, analytics engine 138 uses the information identifying building 330 to search records and public information regarding building 330. In one embodiment, analytics engine 138 may retrieve from network device 160, for example, information regarding plats, property descriptions, architectural drawings, floorplans, etc. from public or private records, advertisement materials, building plans, Freedom of Information Act ("FOIA") documents, etc. Referring to FIG. 3C, a floorplan diagram 320 for building 330 may be retrieved by analytics engine 138 from a database associated with network device 160 in response to a query identifying the street address and/or commercial name of building 330.

Floorplan diagram 320 illustrates the interior layout for a particular floor in building 330, in which the relative locations of individual apartments, hallways, common areas, and/or outer walls may be to scale. In one embodiment, analytics engine 138 may correlate floorplan diagram 320 to building 330. That is, the building exterior shown in image data 310 may be mapped to corresponding apartment locations depicted in floorplan diagram 320. For example, an apartment 350 may be identified in image data 310 and in floorplan diagram 320. In some instances, analytics engine 138 may determine that no public information regarding building 300 is available. For some buildings 330, analytics engine 138 may retrieve more detailed public information. For other buildings 330, analytics engine 138 may be unable to determine an orientation of building 330 from the publicly available information.

In one embodiment, analytics engine 138 may determine that LoS from radio unit 130 to apartment 350, for example, exists. Analytics engine 138 may analyze image data from image data 310 to determine the LoS or a path is obstructed or not between antenna transmitter 134 and apartment 350. Based on the image data, analytics engine 138 may identify one or more objects along the LoS. For example, analytics engine 138 may identify a tree image 360 that at least partially obstructs the would-be LoS. In one embodiment, analytics engine 138 may determine a type of tree for tree image 360. In another embodiment, analytics engine 138 may assign a qualitative value (e.g., low, medium, high, etc.) or a quantitative value (e.g., a percentage, a number between one and ten, etc.) to an extent of the obstruction. In some embodiments, when analytics engine 138 cannot determine from image data 310 that tree image 360 is in fact a tree, analytics engine 138 may classify the obstruction more broadly, such as "foliage" or the like. Other obstructions in the would-be LoS may be classified by analytics engine 138 from image data 310, as signage, structures, or other types of obstructions.

Analytics engine 138 analyzes image data 310 to determine a type of material in the building exterior of apartment 350 that the radio signals must pass through to an interior of apartment 350. For example, analytics engine may determine that the LoS does not terminate at glass at the building exterior, or that the LoS does terminate at a glass door or glass window 370 in the building exterior. In one embodiment, analytics engine 138 may determine that an object is at least partially covering glass window, e.g., shutters, an awning, etc. In another embodiment, analytics engine 138 may determine a type of the glass, for example, low-emissivity (low-E), or non-low-E. In one embodiment, analytics uses data from a ray tracing tool located at radio unit 130.

Analytics engine 138 analyzes image data 310 to determine whether any successful installation of radio receiving equipment (CPE) at another apartment in building 330. Analytics engine 138 may request and receive information from network device 160 regarding current wireless service user locations proximate to apartment 350. For example, analytics engine 138 may determine that an apartment 380 is a user location currently receiving wireless service. Analytics engine 138 may request and receive information regarding signal strength associated with the user location at apartment 380. For example, signal information may include a Received Signal Strength Indicator (RSSI), and/or a Reference Signal Received Quality (RSRQ), such as signal-to-noise ratio (SNR), signal-to-interference-plus-noise ratio (SINR), or other channel condition value measured by a CPE.

Figure 4A:
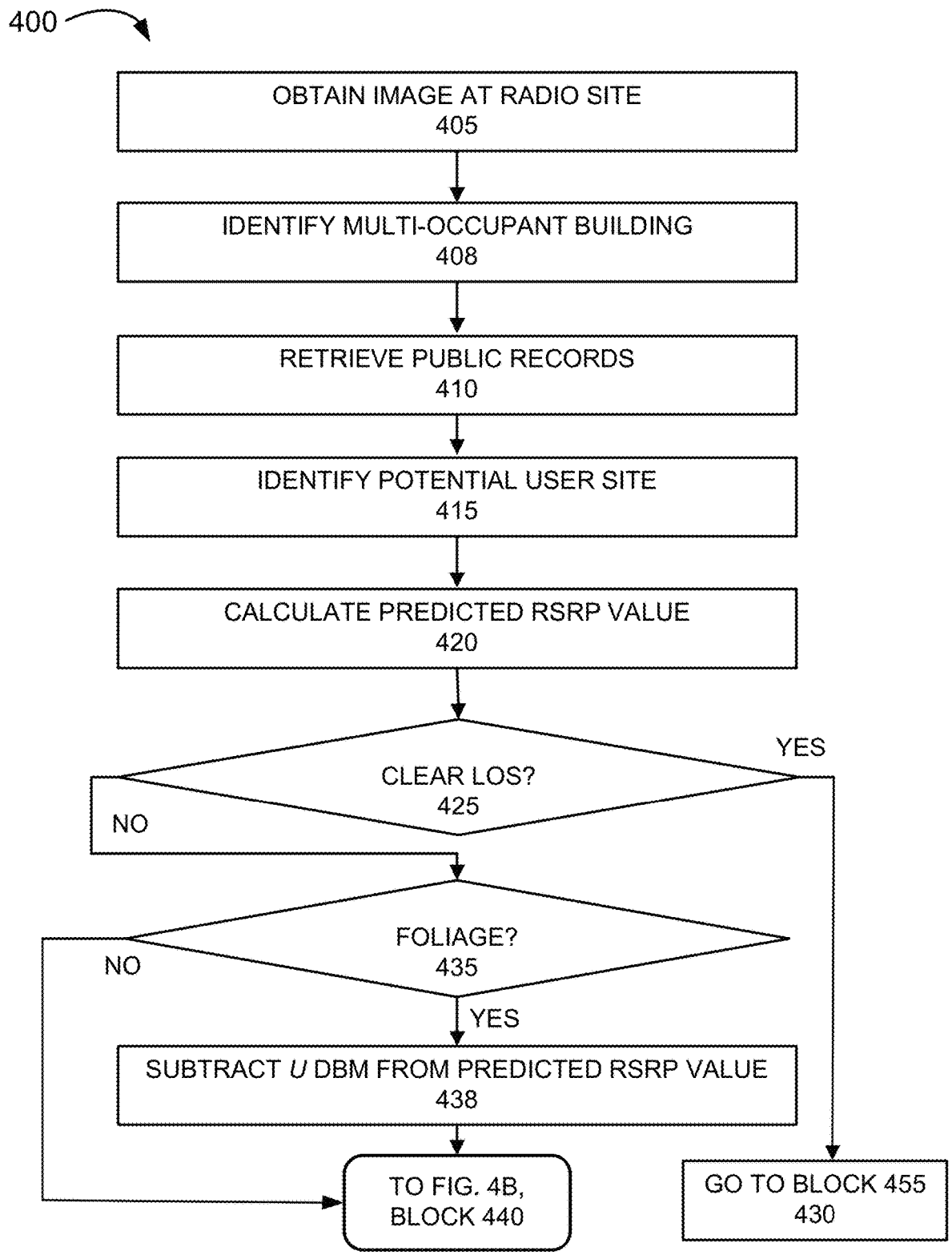
FIGS. 4A-4C are flow diagrams illustrating an exemplary process of an exemplary embodiment of the service qualification.
Figure 4B:
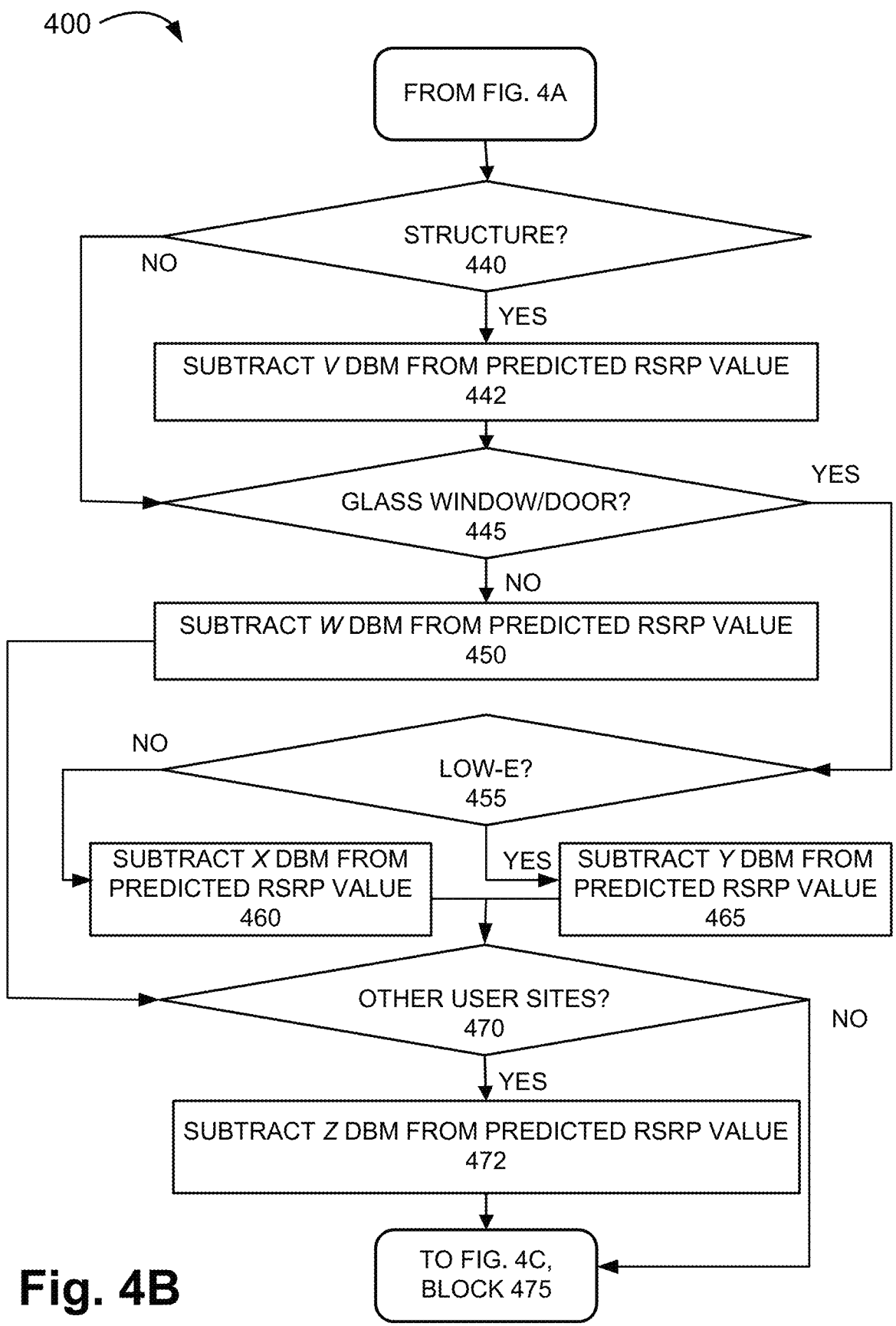
Figure 4C:
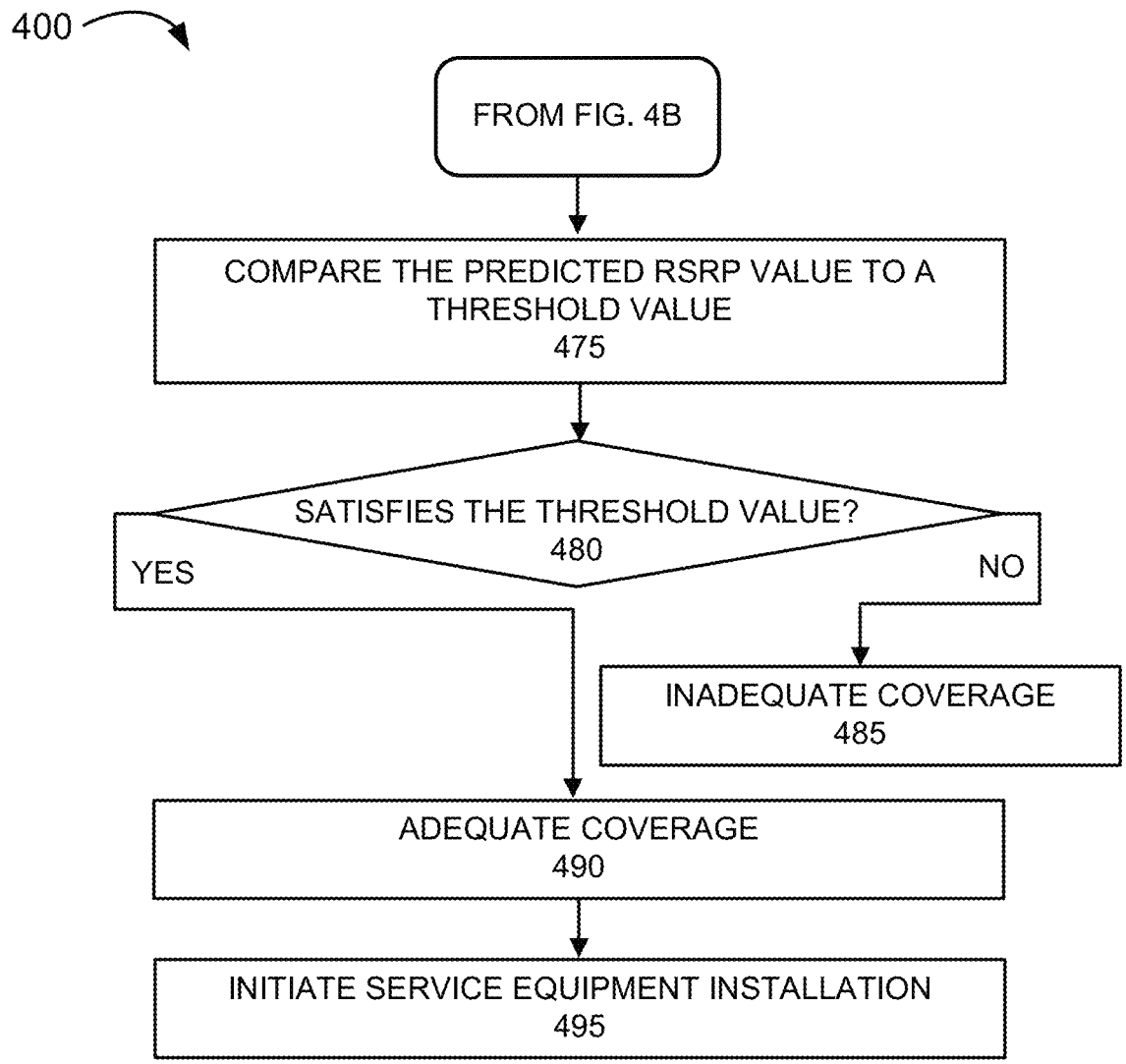

FIGS. 4A-4C are flow diagrams illustrating an exemplary process 400 pertaining to a smart 5G coverage locator system. Process 400 is directed to a process previously described above with respect to FIGS. 3A-3C, as well as elsewhere in this description. According to an exemplary embodiment, analytics engine 138 and network device 160 perform steps of process 400. For example, processor 210 executes software 220 to perform the steps illustrated in FIGS. 4A-4C and described herein.

Referring to FIG. 4A, block 405, a coverage locator system records images (e.g., photo, video) from a wireless radio site. The recorded images may be stored with associated metadata, for example, with temporal information that may demonstrate, for example, seasonal effects and/or other changes in the environmental setting of the radio site that may or may not affect LoS from the radio antenna transmitter.

In block 408, analytics engine 138 analyzes the image data to determine that an image of a building corresponds to a multi-occupant building. For example, analytics engine 138 may recognize text or other indicia, e.g., visible signage, that describes a building's location and/or the nature of its use, and determine that the building is a multi-unit dwelling, a multi-suite office building, etc. According to some exemplary implementations, analytics engine 138 may, at block 410, search a records database using the building identification information, and retrieve public or other information that describes, in varying detail, physical aspects of the building (e.g., entrances, evacuation routes, passageways, interior layout, etc.).

In block 415, analytics engine 138 may analyze the image data using information regarding the interior layout of the building to identify a potential user site (e.g., apartment) in the building. In block 420, analytics engine 138 may retrieve predicted beam RSRP values from a database for a path (of a known distance) from the radio unit to the exterior of the building corresponding to the potential user site within the building.

In block 425, analytics engine 138 analyzes the image data to determine whether a clear LoS can be established between the radio unit and the exterior of the potential user site. Analytics engine 138 may identify any object that may obstruct the radio signal and thus contribute to path loss and diminished signal strength.

When a clear, unobstructed LoS can be established along a path to the potential user site (block 425—YES), then process 400 may proceed to block 455 in FIG. 4B (block 430). Alternatively, when it is determined that the LoS is obstructed by one or more objects (block 425—NO), then analytics engine 138 may determine whether the obstruction visible from the image data can be classified as foliage (block 435). For example, analytics engine 138 may run object recognition logic to classify each obstruction.

When foliage (e.g., a tree) is detected (block 435—YES), analytics engine 138 may subtract a path loss value, from the predicted RSRP value, which value corresponds to the type and/or dimensions of the foliage detected (block 438), and may be retrieved from a database of assigned values, then process 400 may proceed to block 440 in FIG. 4B. Alternatively, when it is determined that the obstruction is not foliage (block 435—NO), then process 400 may continue to block 440 in FIG. 4B without modification to the predicted RSRP value.

Referring to FIG. 4B, in block 440, analytics engine 138 may determine whether the obstruction visible from the image data can be classified as a structure. For example, analytics engine 138 may detect signage or a building that obstructs the LoS (block 440—YES), in which case, analytics engine 138 may subtract a path loss value, from the predicted RSRP value, which value corresponds to the type and/or dimensions of the structure detected (block 442), and may be retrieved from a database of assigned values. In one embodiment, when the obstruction cannot be classified as a structure (block 440—NO), no modification of the predicted RSRP value is made and process 400 continues to block 445.

In some embodiments, when analytics engine 138 detects a structure that obstructs the LoS (block 440—YES), process 400 may include scheduling a subsequent capturing of an image at the radio site (block 405) to determine whether the structure can still be detected. In one embodiment, analytics engine 138 may capture the subsequent image at a different time of day than the time of day associated with the initial image (e.g., non-business hours versus business hours), and/or on a different day of the week than the day of the week associated with the initial image (e.g., weekend versus weekday). Process 400 may include using the subsequent image(s) to determine whether the originally-detected object is a permanent structure (e.g., sign, etc.) or a transient (e.g., a motor vehicle, construction equipment, etc.). Analytics engine 138 may obtain multiple subsequent images to determine a likelihood that structure is a permanent one. When analytics engine 138 determines that the structure was a transient and no longer in the LoS, the predicted RSRP value may be calculated, for example, by omitting the action described in block 442. When analytics engine 138 determines that the structure is permanent, process 400 continues to block 445.

In block 445, analytics engine 138 may analyze the image data, including data from a ray tracing tool, to determine whether a glass window and/or a glass door is visible on the building exterior in an area of the potential user site. When no glass is detected (block 445—NO), analytics engine 138 may subtract a penetration loss value, from the predicted RSRP value, which value corresponds to the type of exterior wall of the building (block 450), and may be retrieved from a database of assigned values. Process 400 may continue to block 470.

When glass is detected in the building exterior (block 445—YES), analytics engine 138 may determine a type of glass, for example, whether the glass is low-E glass (block 455). When analytics engine 138 determines that the glass is low-E glass (block 455—YES), analytics engine 138 may subtract a penetration value, from the predicted RSRP value, which value corresponds to low-E glass (block 465), and may be retrieved from a database of assigned values. Alternatively, when analytics engine 138 determines that the glass is not low-E glass (block 455—NO), analytics engine 138 may subtract a penetration value, from the predicted RSRP value, which value corresponds to non-low-E glass (block 460), and may be retrieved from a database of assigned values.

In block 470, analytics engine 138 may determine whether other user sites with successful wireless equipment installation in the building are proximate to the potential user site. If no other user sites are located (block 470—NO), then process 400 may continue to block 475 (FIG. 4C). When other user sites are proximate to the potential user site (block 470—YES), analytics engine 138 may modify the predicted RSRP value based on signal information available for the other user sites, for example SNR values.

Referring to FIG. 4C, in block 475, analytics engine 138 may compare the predicted RSRP value with a 5G RSRP threshold value. In block 480, analytics engine 138 determines whether the predicted RSRP value satisfies the threshold value. For example, analytics engine 138 may determine whether the calculated 5G received signal power value satisfies the 5G received signal power threshold value based on the comparison.

When it is determined that the predicted 5G RSRP does not satisfy the threshold value (block 480—NO), then analytics engine 138 determines that the potential user site has inadequate 5G coverage and is therefore ineligible for 5G service installation (block 485). When it is determined that the predicted 5G RSRP does satisfy the threshold value (block 480—YES), then the potential user site has adequate 5G coverage and is therefore a candidate for 5G service installation (block 490). In block 495, analytics engine 138 may automatically initiate 5G service equipment installation for the potential user site, for example, which a service install request from the user is pending. For example, analytics engine 138 may generate a notification indicating that the potential user site is qualified for 5G service. The notification may be sent to a user requesting service and/or to the service provider. Additionally or alternatively, analytics engine 138 may automatically generate an order for distribution and/or set-up of 5G receiving equipment at the candidate (i.e., qualified) user site.

Although FIGS. 4A-4C illustrate an exemplary process 400 of the service qualification, according to other embodiments, process 500 may include additional operations, fewer operations, and/or different operations than those illustrated in FIGS. 4A-4C and described herein. Also, in process 400, a service provider may use captured image data from a radio site to address service issues form existing 5G users in the coverage area. For example, the image data may reveal that storm damage has created one or more obstructions in the LoS to one or more existing user sites.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive. In this way, the service qualification and the coverage locator system described herein may be implemented to calculate biased values (e.g., path loss, received signal power, etc.) based on other current or legacy wireless technologies and/or a frequency bands measured.

In addition, while series of blocks have been described with regard to the processes illustrated in FIGS. 4A-4C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 210, etc.), or a combination of hardware and software (e.g., software 220). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 210) of a computational device. A non-transitory storage medium includes one or more of the storage mediums described in relation to memory/storage 215.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Collection, storage, and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   receiving, by a network device, line-of-site (LoS) information obtained by a camera, wherein the LoS information identifies an LoS from a radio site to a potential radio signal receiver location;
   estimating, by the network device, a signal strength value, for a signal from the radio site, at the potential radio signal receiver location;
   determining, by the network device, that the estimated signal strength value exceeds a threshold signal value associated with a wireless service;
   identifying, by the network device, a first type of obstruction in the LoS, wherein the first type of obstruction comprises foliage having an obstructive profile and an associated signal loss that vary by a time of year;
   modifying, by the network device, the estimated signal strength value using a nominal signal loss value for the first type of obstruction, wherein the nominal signal loss value is associated with a different time of year than a time of year in which the LoS information is obtained;
   comparing, by the network device, the modified estimated signal strength value to the threshold signal value; and
   determining, by the network device based on results of the comparing, a qualification of the potential radio signal receiver location for an equipment installation for the wireless service.

2. The method of claim 1, wherein identifying the first type of obstruction comprises:
   using image recognition processing to differentiate the first type of obstruction from a second type of obstruction for which an associated signal loss does not vary the time of year.

3. The method of claim 1, further comprising:
   determining a value for one or more dimensions of the first type of obstruction; and
   determining the nominal signal loss value based on the value for one or more dimensions.

4. The method of claim 1, wherein the LoS information includes a timestamp, the method further comprising:
   determining the different time of year based on the timestamp.

5. The method of claim 1, further comprising:
  detecting a triggering event at the radio site, wherein the LoS information is obtained by the camera in response to the detecting.
6. The method of claim 5, wherein the triggering event comprises a customer service order.
7. The method of claim 1, wherein the potential radio signal receiver location corresponds to an exterior of a structure, the method further comprising:
  subtracting, from the modified estimated signal strength, a signal loss value associated with penetrating the exterior of the structure; and
  determining whether to qualify the potential radio signal receiver location for the equipment installation at an interior of the structure.
8. A network device comprising:
  a communication interface;
  a memory that stores instructions; and
  a processor that executes the instructions to:
    receive line-of-site (LoS) information obtained by a camera, wherein the LoS information identifies an LoS from a radio site to a potential radio signal receiver location;
    estimate a signal strength value, for a signal from the radio site, at the potential radio signal receiver location;
    determine that the estimated signal strength value exceeds a threshold signal value associated with a wireless service;
    identify a first type of obstruction in the LoS, wherein the first type of obstruction comprises foliage having an obstructive profile and an associated signal loss that vary by a time of year;
    modify the estimated signal strength value using a nominal signal loss value for the first type of obstruction, wherein the nominal signal loss value is associated with a different time of year than the time of year in which the LoS information is obtained;
    compare the modified estimated signal strength value to the threshold signal value; and
    determine, based on results of the comparison, a qualification of the potential radio signal receiver location for an equipment installation for the wireless service.
9. The network device of claim 8, wherein to identify the first type of obstruction, the processor further executes the instructions to:
  use image recognition processing to differentiate the first type of obstruction from a second type of obstruction for which an associated signal loss does not vary by the time of year.
10. The network device of claim 8, wherein the processor further executes the instructions to:
  determine a value for one or more dimensions of the first type of obstruction, and
  determine the nominal signal loss value based on the value for one or more dimensions.
11. The network device of claim 8, wherein the LoS information includes a timestamp, and the processor further executes the instructions to:
  determine the different time of year based on the timestamp.
12. The network device of claim 8, wherein the processor further executes the instructions to:
  detect a triggering event at the radio site, wherein the LoS information is obtained by the camera in response to the detection.
13. The network device of claim 12, wherein the triggering event comprises a customer service report.
14. The network device of claim 8, wherein determining whether to qualify the potential radio signal receiver location corresponds to an exterior of a structure, and the processor when determining whether to qualify the potential radio signal receiver location further executes the instructions to:
  subtract, from the modified estimated signal strength, a signal loss value associated with penetrating the exterior of the structure, and
  determine whether to qualify the potential radio signal receiver location for the equipment installation at an interior of the structure.
15. A non-transitory, computer-readable storage medium storing instructions which, when executed by a processor of a network device, cause the network device to:
  receive line-of-site (LoS) information obtained by a camera, wherein the LoS information identifies an LoS from a radio site to a potential radio signal receiver location;
  estimate a signal strength value, for a signal from the radio site, at the potential radio signal receiver location;
  determine that the estimated signal strength value exceeds a threshold signal value associated with a wireless service;
  identify a first type of obstruction in the LoS, wherein the first type of obstruction comprises foliage having an obstructive profile and an associated signal loss that vary by a time of year;
  modify the estimated signal strength value using a nominal signal loss value for the first type of obstruction, wherein the nominal signal loss value is associated with a different time of year than the time of year in which the LoS information is obtained;
  compare the modified estimated signal strength value to the threshold signal value; and
  determine, based on results of the comparison, a qualification of the potential radio signal receiver location for an equipment installation for the wireless service.
16. The non-transitory, computer-readable storage medium of claim 15, wherein to identify the first type of obstruction, the instructions, when executed by the processor, further cause the network device to:
  use image recognition processing to differentiate the first type of obstruction from a second type of obstruction for which an associated signal loss does not vary by the time of year.
17. The non-transitory, computer-readable storage medium of claim 15, wherein the instructions, when executed by the processor, further cause the network device to:
  determine a value for one or more dimensions of the first type of obstruction, and
  determine the nominal signal loss value based on the value for one or more dimensions.
18. The non-transitory, computer-readable storage medium of claim 15, wherein the LoS information includes a timestamp, and the instructions, when executed by the processor, further cause the network device to:
  determine the different time of year based on the timestamp.
19. The non-transitory, computer-readable storage medium of claim 15, wherein the instructions, when executed, cause the network device to:

detect a triggering event at the radio site, wherein the LoS information is obtained by the camera in response to the detection.

20. The non-transitory, computer-readable storage medium of claim 15, wherein the potential radio signal receiver location corresponds to an exterior of a structure, and the instructions to determine whether to qualify the potential radio signal receiver location, when executed, cause the network device to:
- subtract, from the modified estimated signal strength, a signal loss value associated with penetrating the exterior of the structure, and
- determine whether to qualify the potential radio signal receiver location for the equipment installation at an interior of the structure.

* * * * *